Aug. 24, 1948.
E. C. CAPUZZI
2,447,734
FIELD CONTROL FOR TRANSFORMER
TORQUEMETER SIGNAL COILS
Filed Sept. 28, 1946
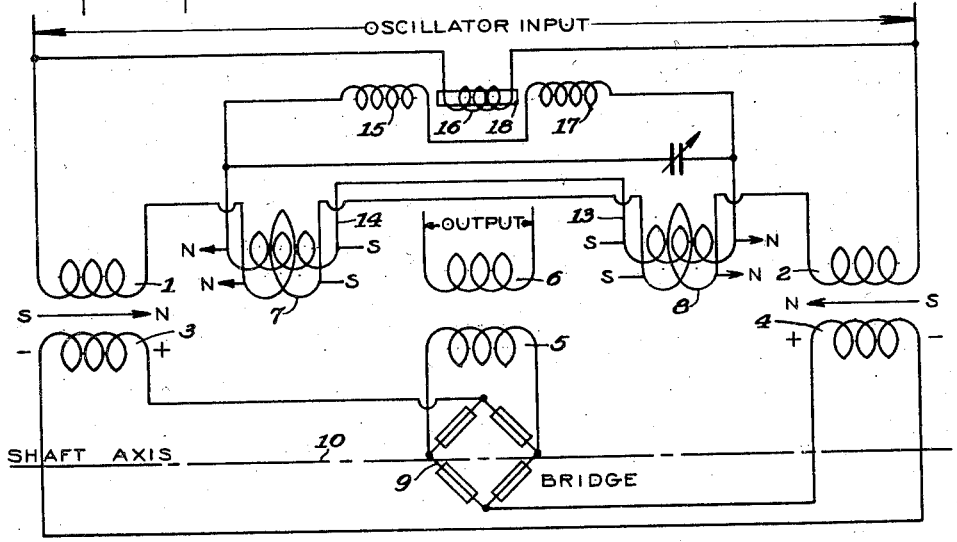
Fig. 1.
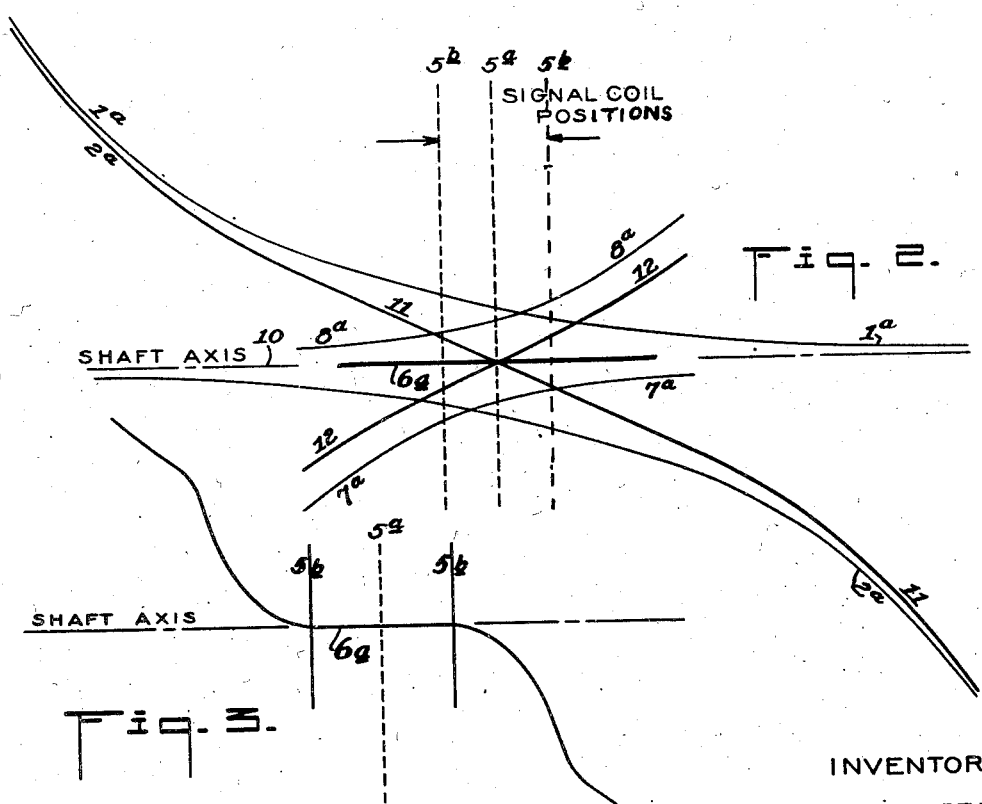
Fig. 2.
Fig. 3.
INVENTOR
E. C. CAPUZZI
BY
ATTORNEY Patented Aug. 24, 1948

2,447,734

UNITED STATES PATENT OFFICE 2,447,734

FIELD CONTROL FOR TRANSFORMER TORQUEMETER SIGNAL COILS

Edmund C. Capuzzi, Philadelphia, Pa., assignor to The Baldwin Locomotive Works, a corporation of Pennsylvania Application September 28, 1946, Serial No. 700,147

3 Claims. (Cl. 323—75)

1

This invention relates generally to a condition responsive apparatus of the type having transformer coils for supplying power to a condition responsive bridge on a rotating member and for transmitting a signal therefrom to a point externally of the rotating member the invention being especially applicable to torquemeters which will be referred to herein for purposes of illustration.

In the torquemeter arrangement shown in the joint application of myself and G. Q. Decker, 3rd, filed May 31, 1946, Serial Number 673,454, of which my present invention is an improvement, when the shaft and transformer coils thereon moved endwise the output coil on the shaft was moved out or tended to be moved out of the region of magnetic balance between the two opposed power input coils. The output coils in moving out of such region move closer to one of the input coils and further away from the other input coil, it being understood that in such prior arrangement the opposed input coils produced, at only a single radial plane, a magnetic field which was zero. Hence, it was necessary to maintain the output coils in an extremely close relation to such single zero position in order to avoid having undesired voltages induced therein.

It is an object of my invention to provide improved means for eliminating errors, in apparatus of the general type herein referred to, that have heretofore occurred when the rotating member had end-play.

A further object is to provide improved means for balancing the bridge signal in a circuit of the type disclosed herein.

Fig. 1 is a wiring diagram of my improved coil arrangement and circuit therefor for eliminating effects of end-play.

Fig. 2 is a chart illustrating the magnetic conditions existing along the axis of rotation whereby the effects of end-play are eliminated or minimized.

Fig. 3 illustrates the net magnetic field along the axis of the rotating member resulting from the interaction of the magnetic fields shown in Fig. 2.

In my present invention, I employ the input and output coil arrangement of said co-pending application consisting of two sets of opposed power input coils 1, 2, 3, 4 and a single set of output or signal coils 5, 6 located approximately in the plane of zero magnetic field effect between the coils 1 and 2. In my present improvement, I have added two field control coils 7 and 8 concentric about the axis of the shaft and generally located at

2 equal distances from the inductively associated output signal coils 5, 6, toward the input coils. The coils 3, 4 and 5 are secured to and encircle the shaft concentric thereto for rotation therewith while coils 1, 2, 6, 7 and 8 are stationary and encircle the shaft concentric thereto in slightly spaced relation to the shaft coils.

It will be understood that the bridge 9 and the input and output coils are electrically connected identically as described in said co-pending application, and hence it will suffice to state that broadly the input coils 1 and 2 are connected in series with each other and that the bridge 9 is connected in series with the other inductively associated input coils 3 and 4. It will be noted that the field control coils 7 and 8 are also connected in series with the input coils 1 and 2. It is, of course, within the scope of my invention to have the coils 7 and 8 supplied from any power source common to the input coils 1 and 2 provided that the magnetic fields of 1 and 7 or 8 and 2 are 180 degrees out of phase with each other. As described in said co-pending application, the magnetic fields for coils 1 and 2 are also 180 degrees out of phase with each other. The bridge 9 employs suitable impedance means which is responsive to whatever condition is being measured, specifically shown herein, for purposes of illustration, as torsion, although other conditions may be measured as shown in Ruge's Patent No. 2,392,293. Preferably, the impedance means comprises wire resistance type strain gages in each arm of the bridge bonded to the shaft surface.

As a result of the foregoing arrangement of the field control coils 7 and 8, I am able to eliminate the effects of a reasonable amount of end-play of the shaft 10 whose end-wise movement causes the coils on the shaft to move axially relative to the stationary coils. The manner of eliminating end-play effects may be explained by the field intensity curve shown in Fig. 2. In this figure, the ordinate represents intensity of the magnetic field, the positive being above the shaft axis 10 and the negative (180 degrees out of phase with positive) being below said shaft axis. Thus curve 1a shows the intensity of the magnetic field generated by coil 1 along the shaft 10. Curve 2a represents the magnetic field generated by coil 2 along the shaft. Inasmuch as the magnetic fields of these two coils 1 and 2 are 180 degrees out of phase they tend to neutralize each other so that the net magnetic field along the shaft between them is reduced and may be represented by the resultant curve 11. In this figure the position of signal coils 5 and 6 is designated by line 5a and it will be noted that this position is at the point of zero resultant magnetic field which is at the point where curve 11 crosses the axis 10. In the event that shaft 10 moves longitudinally due to end-play in the system, it is clear from the figure that coil 5 will in effect move into a position where the net magnetic field resulting from coils 1 and 2 will be acting to an appreciable extent as at position 5b. This results in an undesired voltage being induced across coil 6 by coil 5. Curves 7a and 8a designate the intensity of the magnetic fields generated by coils 7 and 8 respectively. As in the case of coils 1 and 2, the magnetic fields of coils 7 and 8 are 180 degrees out of phase and therefore the net effect of their fields will be curve 12. By suitable positioning of coils 7 and 8 and use of a proper number of turns, it will be noted that the mutual combination of curves 11 and 12 will result in a marked reduction in intensity of the magnetic field over a considerable region around 5a, as separately shown in Fig. 3, which produces the flattened or substantially constant level curve 6a, Figs. 2 and 3. By use of proper spacing and number of turns on coils 7 and 8, the slope of curve 12 can be made such that in combination with resultant curve 11, the net intensity of the magnetic field around the region 5b to 5b will become substantially zero thereby allowing considerable end-play of the shaft without inducing any undesired voltages in the output coil 6. The field control coils 7 and 8 are preferably located relatively close to the signal coils 5, 6 which reduces proportionately the strength of the magnetic field which they must generate and which minimizes any deleterious effect which their opposing fields might have on the transformer action of power coils 1 and 2 thus maintaining high efficiency. Thus it is possible for the shaft to have a change in position while maintaining a substantially constant and preferably zero net inductive effect of the magnetic field on the inductively associated output windings 5 and 6. The extent of permissible axial change, as pointed out above, is dependent upon the number of coil turns, physical spacing, magnitude and phasing of the exciting current, all of which can be readily established in accordance with the curve of Fig. 3.

My field control stator coils 7 and 8 can also be used simultaneously and cooperatively with a further improvement consisting of means for balancing the bridge output voltage in coil 6. As explained in said co-pending application, it may be desirable to either balance the bridge due to conditions beyond the control of the operator or to balance the bridge for purposes of operating an indicator as in a null method system. In that arrangement, the bridge was balanced by injecting balancing voltages directly into the rotating bridge by means of inductively associated rotor and stator windings, whereas, in my present invention I leave the bridge undisturbed and effect balance by bucking out the bridge unbalance voltage induced in coil 6 by rotor coil 5. I am able to do this by employing two stationary balancing coils 13 and 14, surrounding the shaft concentric thereto, the fields thereof being 180 degrees out of phase with each other and so excited with voltage of the proper phase and intensity as to buck out the bridge signal voltage in coil 6 to zero. The manner of supplying voltage of the proper phase and magnitude to coils 13 and 14 is preferably accomplished herein by the use of three coaxially arranged voltage control coils 15, 16 and 17 connected as shown, and through which a movable iron core 18 extends, all as explained and described in said co-pending application. It will also be noted in Fig. 1 that the field control coils 7 and 8 may be arranged concentrically with the balance coils 13 and 14 thereby adding a high degree of compactness without in any way impairing the proper functioning of the respective pairs of coils.

From the foregoing disclosure it is seen that I have provided compact and efficient means for eliminating the effects of shaft end play with usual operating limits and can also effectively balance the bridge.

It will of course be understood that various changes in details of construction and arrangement of parts may be made by those skilled in the art without departing from the spirit of the invention as set forth in the appended claims.

I claim:

1. An electrical system comprising a set of inductively associated power input windings, a set of inductively associated output windings, certain of which are stator and the others of which are rotor coils adapted to have relative axial movement, a rotatable shaft upon which the rotor coils are commonly mounted for rotation therewith, condition responsive impedance means mounted on said shaft for rotation therewith and also adapted to have axial movement with said shaft, said impedance means being electrically connected to certain of the windings of each set whereby power is supplied to said impedance means and an output signal voltage is transmitted therefrom in response to a change of condition, one of said sets of windings being divided and arranged so that their magnetic polarities oppose each other, the windings of the other of said sets being so disposed with respect to said divided windings that the input flux of the latter is substantially incapable of inducing a voltage in the output winding, whereby a change in impedance in response to a change of condition is the essential source of output voltage, and means for controlling the fields of the opposed input windings in the region of the output windings so that the net inductive effect of the said magnetic fields on the inductively associated output windings will remain substantially zero with a change in the relative axial position between said output and input windings.

2. An electrical system comprising a set of inductively associated power input windings, a set of inductively associated output windings, certain of which are stator and the others of which are rotor coils adapted to have relative axial movement, a rotatable shaft upon which the rotor coils are commonly mounted for rotation therewith, condition responsive impedance means mounted on said shaft for rotation therewith and also adapted to axial movement with said shaft, said impedance means being electrically connected to certain of the windings of each set whereby power is supplied to said impedance means and an output voltage is transmitted therefrom in response to a change of condition, one of said sets of windings being divided and arranged so that their magnetic polarity opposes each other, the windings of the other of said sets being so disposed with respect to said divided windings that the input flux is substantially incapable of inducing a voltage in the output winding whereby a change in impedance in response to a change of condition is the essential source of output voltage, and means for controlling the fields of the opposed input windings so that the net magnetic field intensity along the opposing line of said input windings will be substantially constant in the region of the inductively associated output windings.

3. An electrical system comprising a set of inductively associated power input windings, a set of inductively associated output windings, certain of which are stator and the others of which are rotor coils adapted to have relative axial movement, a rotatable shaft upon which the rotor coils are commonly mounted for rotation therewith, condition responsive impedance means mounted on said shaft for rotation therewith and also adapted to have axial movement with said shaft, said impedance means being electrically connected to certain of the windings of each set whereby power is supplied to said impedance means and an output signal voltage is transmitted therefrom in response to a change of condition, one of said sets of windings being divided and arranged so that their magnetic polarities oppose each other, the windings of the other of said sets being so disposed with respect to said divided windings that the input flux of the latter is substantially incapable of inducing a voltage in the output winding, whereby a change in impedance in response to a change of condition is the essential source of output voltage, and means operative on the output side of said inductively associated output windings for balancing a signal voltage therefrom.

EDMUND C. CAPUZZI.

REFERENCES CITED

The following references are of record in the file of this patent:

UNITED STATES PATENTS

| Number | Name | Date |
|---|---|---|
| 2,223,056 | Berthold | Nov. 26, 1940 |